Aug. 17, 1948.   J. KOLLMAN   2,447,126
BAKING PAN ASSEMBLY
Filed Oct. 12, 1946

Inventor,
Jack Kollman
By. Attorney.

Patented Aug. 17, 1948

2,447,126

UNITED STATES PATENT OFFICE 2,447,126

BAKING PAN ASSEMBLY

Jack Kollman, Chicago, Ill., assignor to Ekco Products Company, Chicago, Ill., a corporation of Illinois Application October 12, 1946, Serial No. 703,025

3 Claims. (Cl. 220—23.8)

This invention relates to a multiple baking pan assembly wherein a plurality of pans, such as cake pans of circular peripheral contour or shape are rigidly connected within a supporting frame to create a unitary structure.

In pan sets of this character it has been customary to place a number of pans in spaced relationship and surround them with a frame of metal strapping to which each of the pans was secured in spaced rows and in spaced relation to each other. It has also been customary to maintain the spacing of the pans by extending spaced internal cross braces through the pan set, each brace contacting the adjoining walls of the pans and rigidly secured at its opposite ends to the frame of metal strapping surrounding the pan set.

In the pan sets of this type it has been usual to have the outer frame of metal strapping arranged to contact the outer surface of the pan in an arc conforming to the curvature of the pan wall so as to dispose the opposed portions of the outer strapping member in alignment with the ends of the internal brace members substantially inward of a plane common to the outwardmost surfaces of the outer strapping member conforming to the curvature of the pans. This former construction failed to protect the pans against distortion under force of blows applied to the outer strapping member when the latter was struck against a table or dumping platform to loosen and remove the baked goods from the pans.

The present invention has in view a feature adapted to be incorporated in the portion of the outer strapping member in alignment with the ends of the internal cross braces which protrudes outwardly from the portion of the strapping member conforming to the curvature of and in contact with the pan walls and serves as a bumper or shock absorber for transmitting the force of pan dumping blows directly to the cross bracer, so as to protect the pans against distortion under the strain of such impact.

With the above and other objects in view, as will be apparent, this invention consists in the construction, combination and arrangement of parts, and is hereinafter more fully claimed, described and illustrated in the accompanying drawing wherein:

Figure 1:
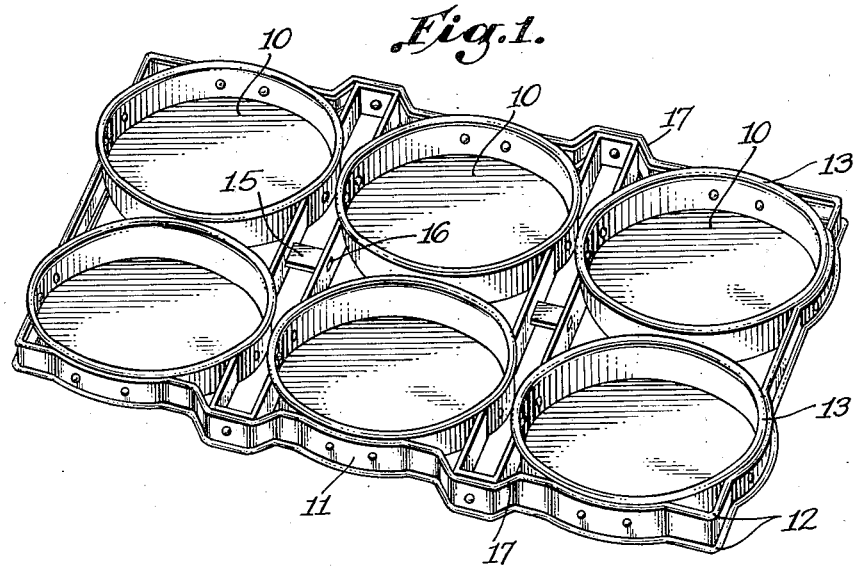
Fig. 1 is a top perspective view illustrating the present invention.
Figure 2:
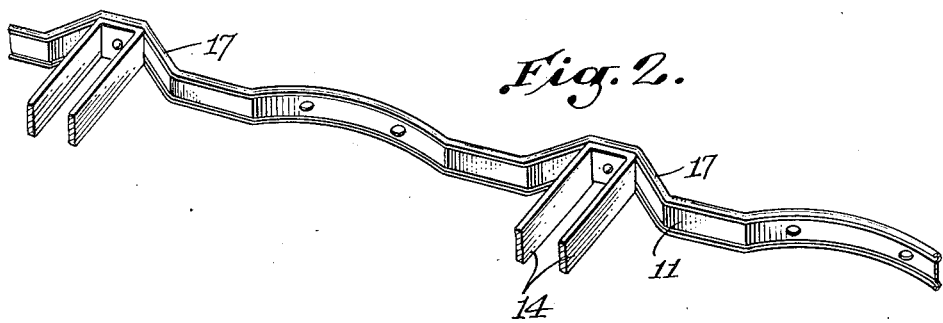
Fig. 2 is a fragmentary enlarged perspective view illustrating details of construction and design of parts.

Reference being had more particularly to the drawings, 10 indicates a round relatively shallow baking pan, a number of which are placed in spaced relationship to constitute a baking pan set. In assembling the individual pans 10 to create a pan set, the pans 10 are arranged in parallel rows, in the present instant illustrated as two rows. A frame 11 of metal strapping entirely surrounds the spaced pans assembled in parallel rows and is arcuately formed at spaced intervals along its length to conform with the curvature of and engage the exposed surfaces of the walls of the pans 10, to which the frame 11 is secured in any suitable manner such as riveting or spot welding, etc. Accordingly, each pan 10 in the set is secured to the frame 11 and a space is provided not only between the individual pans of each row but between the rows themselves. Longitudinal beads or corrugations 12 are usually formed along the top and bottom edges of the strap 11, the bead 12 at the upper edge being arranged to rest approximately adjacent to a bead 13 formed around the upper periphery of each of the pans 10. These beads or corrugations 12 along the upper edges of the strap 11 peripherally extend beyond the outer limits of the adjoining beads 13 of the pans 10 and protect the beads 13, as well as the pan walls, from shocks, bumps or jars which might otherwise damage the beads and pan walls.

In order to support and space the inner portions of the pans 10, one from the other, that is, those parts remote from the frame or strap 11, a pair of substantially parallel spaced metal cross braces 14 are placed between the rows of pans 10, each member part of the pair of braces 14 being arranged to contact the inner portions of the walls of one row of pans 10 while the other member of said pair of braces contacts with the inner portions of the walls of the opposite row of pans 10. These braces 14 are secured to the walls of the pans 10 by any suitable means, such as riveting, spot welding, etc., so that when they are secured in their proper positions the pans 10, the frame 11, and the cross braces 14 constitute a rigid unitary structure. In order to maintain the braces 14 in their spaced positions and to reinforce them as well as the pans 10, a spacer 15 is interposed between the braces 14 at one or more points along their length and is secured at its ends to said braces as at 16.

In order to protect the pans against distortion under the strain of blows applied to the frame 11 as an incident to loosening and removing the baked contents of the pans 10 by pounding the sides of the pan unit against a table or dumping platform, the portion of the frame 11 in alignment with the opposite ends of the braces 14 are offset as at 17 to present a surface outwardly of the outermost surface of the portion of the frame 11 extending laterally in opposite directions therefrom which is curved to conform with the contour of the pans 10. The ends of the braces 14 are connected directly to the inner side of the projections 17 formed in the frame 11 whereby the force of blows applied to the projection 17 is transmitted directly to the bracing members 14 so as to shield the pans 10 under impact against said projection 17.

Accordingly the provision of a bumper or shock absorber by means of the projection 17 formed in the frame 11, as contemplated in the present invention, affords such added reinforcement as to prolong the life of the pans 10 under conditions of severe usage. Moreover, the construction of a bake pan unit of this character with the added reinforcement feature provided by the projection 17 involves relatively low cost of production in that it does not require additional parts.

What is claimed is:

1. In a baking pan set comprising a plurality of spaced baking pans of circular periphery arranged in rows, means secured to the outer wall of each of said pans including a strap of such longitudinal dimension as to completely surround said pan set and having arcuately formed portions conforming to and bearing against the outer wall portions of each of said pans, said strap having a portion intermediate its arcuately formed portions offset outwardly from a plane common to the outer surface of the arcuate portions thereof extending laterally in opposite direction therefrom, a bracer extending from the pans of one row to the pans in the next adjacent row and fixed to the walls of each of said pans, said bracer having its ends rigidly secured to the inner side of said outwardly offset portions of said strap.

2. In a baking pan set, as claimed in claim 1, wherein said strap is provided with longitudinal beads at the upper and lower edges thereof.

3. In a baking pan set comprising a plurality of spaced baking pans of circular periphery arranged in rows, means secured to the outer wall of each of said pans including a strap of such longitudinal dimension as to completely surround said pan set and bearing against the outer wall portions of each of said pans, said strap having a portion intermediate its arcuately formed portions offset outwardly from a plane common to the outer surface of the portions thereof extending laterally in opposite direction therefrom, and bearing against the pans, a bracer extending from the pans of one row to the pans in the next adjacent row and fixed to the walls of each of said pans, said bracer having its ends rigidly secured to the inner side of said outwardly offset portions of said strap.

JACK KOLLMAN.